United States Patent [19]

Ormiston

[11] Patent Number: 4,740,027
[45] Date of Patent: Apr. 26, 1988

[54] SPRING CLIP FASTENER SYSTEM

[75] Inventor: Stephen C. Ormiston, Columbiaville, Mich.

[73] Assignee: Durakon Industries, Inc., Lapeer, Mich.

[21] Appl. No.: 20,631

[22] Filed: Mar. 2, 1987

[51] Int. Cl.⁴ ............................................. B62D 33/02
[52] U.S. Cl. .................................................. 296/39 R
[58] Field of Search .......................... 296/39 R, 39 A; 224/42.42 R

[56] References Cited

U.S. PATENT DOCUMENTS

| | | | |
|---|---|---|---|
| 4,047,749 | 9/1977 | Lambitz et al. | 296/39 R |
| 4,336,963 | 6/1982 | Nix et al. | 296/39 R |
| 4,540,214 | 9/1985 | Wagner | 296/39 R |
| 4,592,583 | 6/1986 | Dresen et al. | 296/39 R |

Primary Examiner—Robert R. Song
Attorney, Agent, or Firm—Cullen, Sloman, Cantor, Grauer, Scott & Rutherford

[57] ABSTRACT

A retainer for securing a flangeless cargo liner within a truck bed compartment such that the top rail of the truck bed compartment is unobstructed. The retainer including a clip portion with outwardly extending divergent legs. The legs being resilient such that they may be squeezed in the direction of the clip portion so that they may be inserted behind the top rail and clipped to the edge of the liner. The fastener is formed from a single piece of wire which is first bent to form the clip portion and then further bent to form the divergent legs. The legs diverge outwardly from the clip portion in both the horizontal and vertical planes to facilitate retention of the liner.

18 Claims, 2 Drawing Sheets

U.S. Patent    Apr. 26, 1988    Sheet 1 of 2    4,740,027
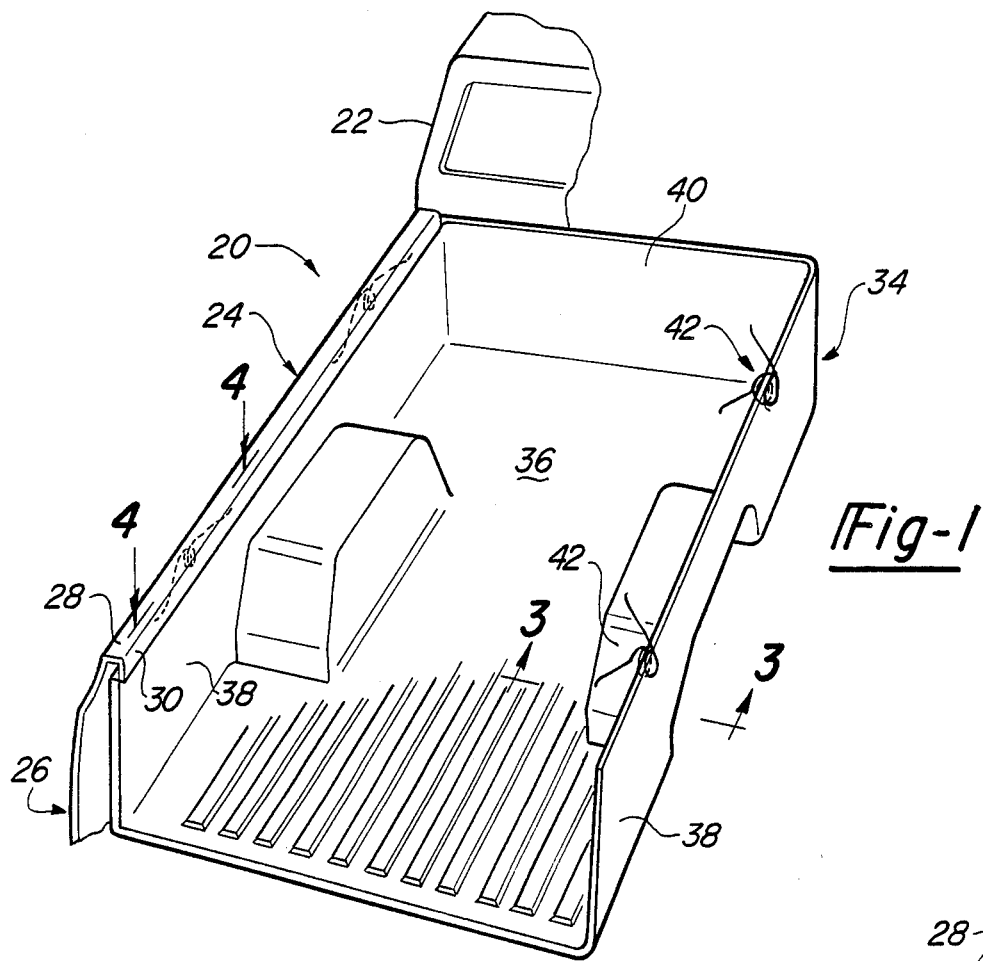
Fig-1
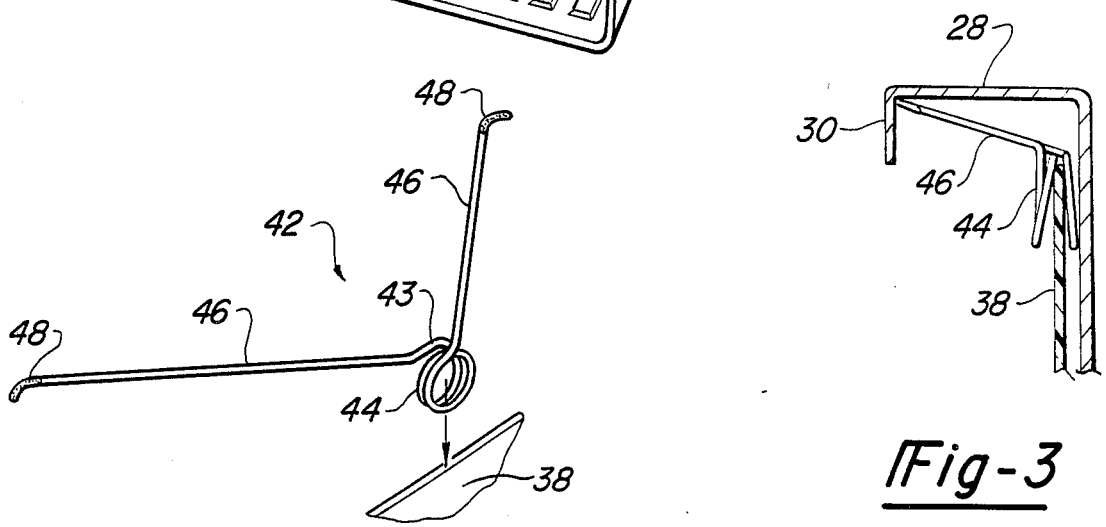
Fig-2
Fig-3

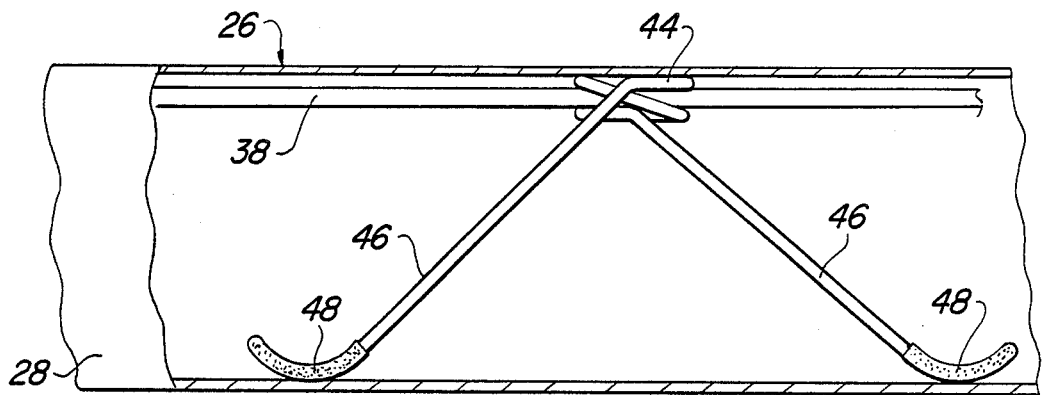
Fig-4
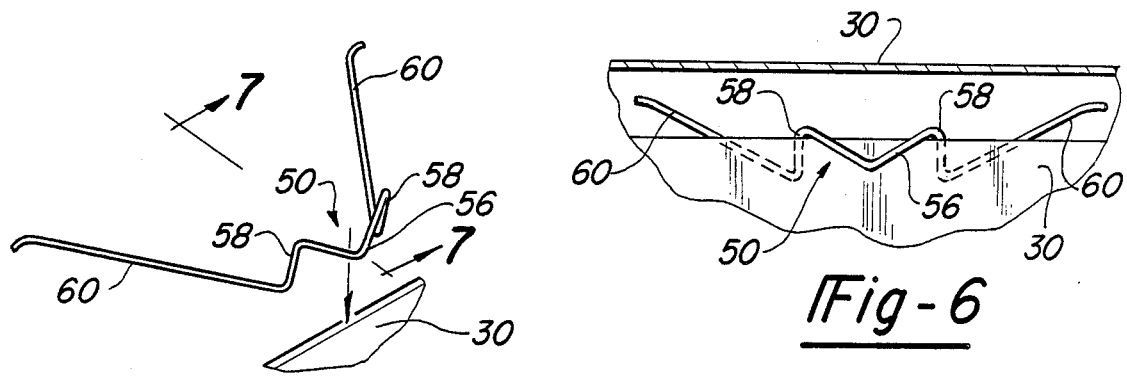
Fig-5
Fig-6
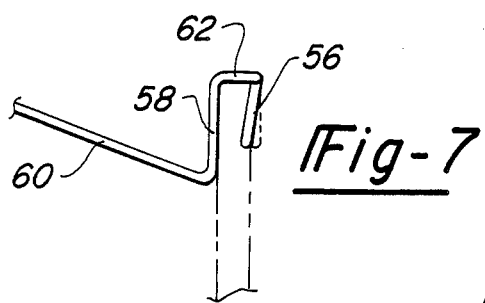
Fig-7
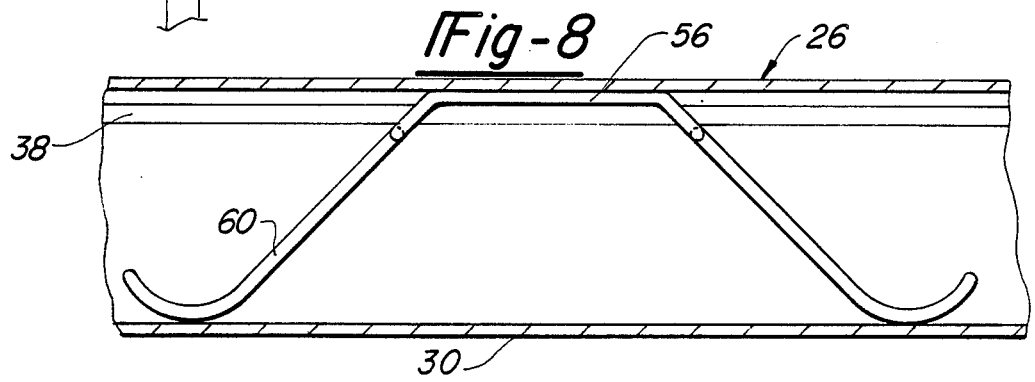
Fig-8

SPRING CLIP FASTENER SYSTEM

BACKGROUND OF THE INVENTION

The present invention relates to molded plastic liners for truck cargo beds and, more particularly, to retainers for securing a cargo liner within a truck bed compartment.

Various truck bed liners have been disclosed in prior art patents including U.S. Pat. Nos. 4,047,749 to Lambitz et al. and 4,341,412 to Wayne. Both of these patents show cargo liners having a flange about their upper edge which covers the top rail of the truck bed compartment. It is conventional to secure this liner flange to the top rail of the truck bed compartment with fasteners. When it is desired to attach a camper top or cover to the top rail of the truck bed compartment, the liner flange may interfere or prevent such attachment.

Thus, the present invention relates to a molded plastic liner that does not include a top ledge portion and to retainer means for securing such a liner within a truck bed compartment. It is, therefore, an object of the present invention to provide a cargo liner which permits a camper top or a cover to be attached to the top rail of the truck bed compartment without interference or obstruction from a liner flange. Further, it is an object of the present invention to provide a retainer means which permits easy attachment and detachment of the flangeless liner to the truck bed compartment.

SUMMARY OF THE INVENTION

According to the present invention, a flangeless cargo liner is inserted into a truck bed compartment with the side and front walls of the liner positioned adjacent the truck side and front walls and held in place by the retaining means of the present invention. A plurality of liner retaining means made in accordance with the present invention are clipped to the top edge of the liner and fastened behind the truck bed ledge walls.

In the preferred embodiment of the invention, the fastener is formed from a single piece of wire which is bent to form a clip portion with divergent legs. In one embodiment, the clip portion is formed by bending the wire into two closely adjacent circles which are spread apart when the fastener is forced onto the liner edge. In a second embodiment, the clip portion is formed by bending the center of the wire into a substantially "M" shape. The clip portion of the second embodiment is forced onto the edge such that the center portion of the "M" is on one side of the liner with the legs of the "M" on the other side.

In both embodiments of the invention, the legs of the fastener are angled with respect to the clip portion in both the horizontal and vertical planes. In this manner, the legs fit into the corner of the truck bed formed by the intersection of the ledge portion and the top rail. This insures that the fasteners remain properly positioned.

To secure the cargo liner within the truck bed compartment, the legs of the fastener are urged or squeezed in the direction of the clip portion so that the fastener can be easily positioned behind the ledge walls. With the legs bent back the clip portion is clipped over the liner top edge after which the legs are released to bias against the ledge walls. In this manner, the cargo liner is quickly and conveniently secured within the truck bed compartment without the need for drilling holes in the truck bed or otherwise disturbing its integrity.

Other advantages and meritorious features of the present invention will be more fully understood from the following description, the appended claims, and the drawings, a brief description of which follows.

BRIEF DESCRIPTION OF THE DRAWINGS

FIG. 1 is a fragmentary perspective view of a pick-up truck illustrating the cargo liner and retaining means of the present invention.

FIG. 2 is a fragmentary perspective assembly view of one embodiment of the retaining means which is clipped to the top edge of the cargo liner side wall.

FIG. 3 is a view taken along line 3—3 in FIG. 1 illustrating the mounting of the retaining means beneath the truck bed rail.

FIG. 4 is a view, partly in cross-section, taken along line 4—4 in FIG. 1.

FIG. 5 is a fragmentary perspective view of another embodiment of the retaining means of the present invention.

FIG. 6 is a fragmentary view illustrating the retaining means of FIG. 5 clipped to a liner.

FIG. 7 is a cross-section view taken along line 7—7 in FIG. 5.

FIG. 8 is a cross-sectional view similar to FIG. 4 but showing the fastener of FIG. 5.

DETAILED DESCRIPTION OF THE INVENTION

Referring now to the drawings, FIG. 1 illustrates a conventional pick-up truck 20 having a cab 22 and a truck bed or cargo compartment 24. Truck bed 24 includes front and side walls 26 with each wall having a top rail 28 and a downwardly extending ledge wall 30. A cargo liner 34 of generally uniform thickness is inserted within the truck bed compartment 24. The cargo liner 34 has a base portion 36, opposed side walls 38, and a front wall 40. The cargo liner 34 does not have a top flange which some liners have had for covering the top wall 28 of the truck bed compartment 24. Instead, the liner 34 is flangeless whereby the side and front walls 38 and 40 of liner 34 are positioned inside the truck bed ledge walls 30 adjacent the side and front walls 26 and are held in close relationship with walls 26 by the retaining means of the present invention, as will now be described.

A plurality of spring clip retaining means 42 are clipped to the top edge of the liner walls 38. Each retaining means 42 includes a clip portion 44 and divergent legs 46. In the preferred embodiment, the retaining means 42 is formed from a single piece of wire which is bent into two closely adjacent circles from which the leg portions then extend. The two circles are slightly spaced apart at 43 to provide a better gripping action. The legs 46 are bent so that they have a spring bias and are angled with respect to the clip portion in both the horizontal and vertical planes. As illustrated in FIG. 3, the angle in the vertical plane permits the legs 46 to fit into the corner formed between the ledge wall 30 and top rail 28. This ensures that the retaining means 42 remains properly positioned and provides a downward and horizontal bias to liner wall 38. Referring to FIG. 4, the angle in the horizontal plane provides stability to the retaining means 42 and a horizontal bias to liner wall 38. To further facilitate proper retention, feet 48 may be formed at the ends of legs 46. Feet 48 can be covered by a gripping material such as rubber to further facilitate retention.

To secure the cargo liner 34 into the truck bed 24, each leg 46 of retaining means 42 is pressed or urged in the direction of clip portion 44 to narrow the width of the retaining means 42. Retaining means 42 can then be positioned behind ledge wall 30 and clipped over the top edge of liner side wall 38. The legs 46 are then released to biasly engage the inside of ledge walls 30. Due to the bias of legs 46 and their angle with respect to clip portion 44, the retainer is urged back against side walls 26 and downwardly against the floor of the cargo compartment. In this manner, the cargo liner 34 is quickly and conveniently secured within truck bed compartment 24 without the need for drilling holes in bed 24 or otherwise disturbing its integrity. Further, since liner 34 does not have a top flange, the top rail 28 of truck bed 24 is unobstructed thereby permitting a camper top or cover to be secured thereto.

FIGS. 5 through 8 illustrate a further embodiment of the spring clip fastener of the present invention. Clip portion 50 of the second embodiment is formed by bending the midsection of the wire into substantially an "M" shape. With reference to FIG. 6, it can be seen that the center portion 56 of clip portion 50 engages one side of liner 30 and the downwardly extending portions 58 of clip portion 50 engage the opposite side of liner 30. To obtain a good grip from the clip portion 50 on the liner 30 an intermediate or connecting portion 62 may be provided. Portion 62 widens the clip portion so that it can firmly grip the liner 30. The legs 60 of the fastener diverge outwardly from the clip portion 50 in the same manner as the legs 46 of the previous embodiment.

It will be apparent to those skilled in the art that the foregoing disclosure is exemplary in nature rather than limiting, the invention being limited only by the appended claims.

What is claimed is:

1. A retainer for securing a protective liner within a truck bed compartment having a top rail and a downwardly extending ledge from the top rail, the retainer having a clip portion and resilient outwardly divergent legs, the clip portion being clipped onto an upper portion of the liner with the divergent legs being positioned behind and biasing against the ledge for securing the liner to the truck bed compartment.

2. The retainer of claim 1, wherein the clip portion includes two closely adjacent members resiliently joined such that upon engagement with the liner the members spread open to grip the liner therebetween.

3. The retainer of claim 2, wherein the members are slightly spaced apart to facilitate proper clipping to the liner edge.

4. The retainer of claim 1, wherein the retainer is formed of a single piece of wire and the clip portion is formed by bending the wire into two closely adjacent leg members such that upon engagement with the liner leg members spread open to grip the liner therebetween.

5. The retainer of claim 1, wherein the clip portion includes three adjacent downwardly extending members, the two outer members of the three members engaging one side of the liner top edge and the center member of the three members engaging the opposite side of the liner top edge whereby the liner is gripped therebetween.

6. The retainer of claim 1, wherein the clip portion includes three closely adjacent members such that upon engagement with the liner the members separate to grip the liner therebetween.

7. The retainer of claim 6, wherein the members are slightly spaced apart to facilitate gripping the liner edge.

8. The retainer of claim 6, wherein the three members are formed from two adjacent acute angles having adjacent sides joined to form a third acute angle.

9. The retainer of claim 1, wherein the legs are angled with respect to the clip portion in both the horizontal and vertical planes whereby the legs engage at the intersection of the ledge and top rail.

10. The retainer of claim 1, further comprising a foot at the end of each leg to facilitate retention of the liner.

11. The retainer of claim 1, wherein the legs are bent to have a spring bias and are adapted to be squeezed in the direction of the clip portion to narrow the width of the retainer so that the retainer can be positioned behind the ledge wall and clipped to the edge of the liner and thereafter the legs bias against the ledge wall to retain the liner within the truck bed compartment.

12. In a truck bed compartment having a front wall and opposed side walls with the upper portion of the walls including a downwardly extending ledge and protective liner within the truck bed compartment including a front wall and opposed side walls, the improvement comprising:
means for securing the liner to the truck bed compartment, the securing means including a clip portion which is adapted to be clipped to the top edge of the liner and resilient legs which diverge outwardly from the clip portion to biasly engage the inside of the ledge thereby securing the liner to the truck bed compartment.

13. The retainer of claim 12, wherein the clip portion includes two closely adjacent members resiliently jointed such that upon engagement with the liner the members spread open to grip the liner therebetween.

14. The retainer of claim 13, wherein the members are slightly spaced apart to facilitate proper clipping to the liner edge.

15. The retainer of claim 12, wherein the retainer is formed of a single piece of wire and the clip portion is formed by bending the wire into two closely adjacent members such that upon engagement with the liner the members spread open to grip the liner therebetween.

16. The retainer of claim 12, wherein the clip portion includes three closely adjacent members resiliently joined such that upon engagement with the liner the members separate to grip the liner therebetween, the members being slightly spaced apart to facilitate gripping the liner edge.

17. The retainer of claim 12, wherein the legs are angled with respect to the clip portion in both the horizontal and vertical planes whereby the legs engage at the intersection of the ledge and top rail.

18. A retainer for securing a protective liner within a truck bed compartment having a truck rail and a downwardly extending ledge from the truck rail, the protective liner having a base and side walls which substantially conform to the interior of the truck bed compartment;
the retainer comprising a clip portion adapted to clip over the edge of the wall; and
resiliently outwardly protruding retaining legs having a first position wherein the legs are at a first angle to one another, the legs being adapted to be biased to a second position such that they are positionable behind the ledge whereafter the legs are adapted to press against the ledge to retain the liner within the compartment.

* * * * *